United States Patent
Medioni et al.

(10) Patent No.: US 9,916,863 B1
(45) Date of Patent: Mar. 13, 2018

(54) SYSTEMS AND METHODS FOR EDITING VIDEOS BASED ON SHAKINESS MEASURES

(71) Applicant: GOPRO, INC., San Mateo, CA (US)

(72) Inventors: Tom Medioni, Paris (FR); Vincent Garcia, Issy-les-Moulineaux (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/442,050

(22) Filed: Feb. 24, 2017

(51) Int. Cl.
| | |
|---|---|
| *H04N 5/93* | (2006.01) |
| *G11B 27/031* | (2006.01) |
| *H04N 5/14* | (2006.01) |
| *G06K 9/00* | (2006.01) |
| *H04N 9/64* | (2006.01) |

(52) U.S. Cl.
CPC ........ *G11B 27/031* (2013.01); *G06K 9/00751* (2013.01); *G06K 9/00758* (2013.01); *H04N 5/144* (2013.01); *H04N 9/646* (2013.01)

(58) Field of Classification Search
CPC ...... G11B 27/031; H04N 5/144; H04N 9/646; G06K 9/00751; G06K 9/00758
USPC .......................... 386/278, 281, 290, 323, 326
See application file for complete search history.

(56) References Cited

U.S. PATENT DOCUMENTS

| | | |
|---|---|---|
| 6,633,685 B1 | 10/2003 | Kusama |
| 7,512,886 B1 | 3/2009 | Herberger |
| 7,885,426 B2 | 2/2011 | Golovchinsky |
| 7,970,240 B1 | 6/2011 | Chao |
| 8,180,161 B2 | 5/2012 | Haseyama |
| 8,606,073 B2 | 12/2013 | Woodman |
| 8,774,560 B2 | 7/2014 | Sugaya |
| 8,971,623 B2 | 3/2015 | Gatt |

(Continued)

FOREIGN PATENT DOCUMENTS

| | | |
|---|---|---|
| JP | H09181966 A | 7/1997 |
| JP | 2005252459 A | 9/2005 |

(Continued)

OTHER PUBLICATIONS

Nicole Lee, Twitter's Periscope is the best livestreaming video app yet; Mar. 26, 2015 URL:http://www.engadget.com/2015/03/26/periscope/ [Retrieved Aug. 25, 2015] 11 pages.

(Continued)

*Primary Examiner* — Robert Chevalier
(74) *Attorney, Agent, or Firm* — Sheppard Mullin Richter & Hampton LLP (57) ABSTRACT

Video information defining video content may be accessed. The video content may include video frames. Motion vectors for the video frames may be determined. The motion vectors may represent motion of one or more visuals captured within individual video frames. A transformation matrix for the video frames may be determined based on the motion vectors. The transformation matrix may characterize rigid transformations between pairs of the video frames. Shakiness metrics for the video frames may be determined based on the transformation matrix. A shakiness threshold may be obtained. One or more of the video frames may be identified based on the shakiness metrics, the shakiness threshold, and algorithms with hysteresis or finite-state machines. A video summary of the video content may be generated. The video summary may include the one or more identified video frames.

20 Claims, 8 Drawing Sheets

(56) References Cited

U.S. PATENT DOCUMENTS

| | | | |
|---|---|---|---|
| 8,990,328 B1 | 3/2015 | Grigsby | |
| 9,041,727 B2 | 5/2015 | Ubillos | |
| 9,142,257 B2 | 9/2015 | Woodman | |
| 9,342,376 B2 | 5/2016 | Jain | |
| 9,418,283 B1 | 8/2016 | Natarajan | |
| 2002/0165721 A1 | 11/2002 | Chang | |
| 2004/0001706 A1 | 1/2004 | Jung | |
| 2005/0025454 A1 | 2/2005 | Nakamura | |
| 2005/0108031 A1 | 5/2005 | Grosvenor | |
| 2005/0198018 A1 | 9/2005 | Shibata | |
| 2006/0080286 A1 | 4/2006 | Svendsen | |
| 2006/0115108 A1 | 6/2006 | Rodriguez | |
| 2007/0183497 A1* | 8/2007 | Luo | G06F 17/30811 375/240.12 |
| 2008/0123976 A1 | 5/2008 | Coombs | |
| 2008/0183843 A1 | 7/2008 | Gavin | |
| 2009/0019995 A1 | 1/2009 | Miyajima | |
| 2009/0027499 A1 | 1/2009 | Nicholl | |
| 2009/0125559 A1 | 5/2009 | Yoshino | |
| 2009/0252474 A1 | 10/2009 | Nashida | |
| 2010/0046842 A1 | 2/2010 | Conwell | |
| 2010/0086216 A1 | 4/2010 | Lee | |
| 2010/0161720 A1 | 6/2010 | Colligan | |
| 2010/0199182 A1 | 8/2010 | Lanza | |
| 2010/0274714 A1 | 10/2010 | Sims | |
| 2010/0318660 A1 | 12/2010 | Balsubramanian | |
| 2011/0103700 A1 | 5/2011 | Haseyama | |
| 2011/0137156 A1 | 6/2011 | Razzaque | |
| 2011/0170086 A1 | 7/2011 | Oouchida | |
| 2011/0206351 A1 | 8/2011 | Givoly | |
| 2011/0242098 A1 | 10/2011 | Tamaru | |
| 2012/0014673 A1 | 1/2012 | O'Dwyer | |
| 2012/0027381 A1 | 2/2012 | Kataoka | |
| 2012/0030263 A1 | 2/2012 | John | |
| 2012/0141019 A1 | 6/2012 | Zhang | |
| 2012/0210205 A1 | 8/2012 | Sherwood | |
| 2012/0210228 A1 | 8/2012 | Wang | |
| 2012/0246114 A1 | 9/2012 | Edmiston | |
| 2012/0283574 A1 | 11/2012 | Park | |
| 2013/0182166 A1 | 7/2013 | Shimokawa | |
| 2013/0235071 A1 | 9/2013 | Ubillos | |
| 2013/0239051 A1 | 9/2013 | Albouze | |
| 2013/0330019 A1 | 12/2013 | Kim | |
| 2014/0149865 A1 | 5/2014 | Tanaka | |
| 2014/0152762 A1 | 6/2014 | Ukil | |
| 2014/0282661 A1 | 9/2014 | Martin | |
| 2015/0036010 A1* | 2/2015 | Wu | H04N 5/23248 348/208.6 |
| 2015/0039646 A1 | 2/2015 | Sharifi | |
| 2015/0071547 A1 | 3/2015 | Keating | |
| 2015/0113009 A1 | 4/2015 | Zhou | |
| 2015/0146022 A1* | 5/2015 | Pham | H04N 5/23254 348/208.4 |
| 2015/0156247 A1 | 6/2015 | Hensel | |
| 2015/0287435 A1 | 10/2015 | Land | |
| 2016/0029105 A1 | 1/2016 | Newman | |
| 2016/0055381 A1* | 2/2016 | Adsumilli | G06K 9/00751 386/241 |
| 2016/0094601 A1 | 3/2016 | Besehanic | |
| 2016/0103830 A1 | 4/2016 | Cheong | |
| 2016/0189752 A1 | 6/2016 | Galant | |
| 2016/0260000 A1 | 9/2016 | Yamakawa | |
| 2016/0286235 A1 | 9/2016 | Yamamoto | |

FOREIGN PATENT DOCUMENTS

| | | |
|---|---|---|
| JP | 2006053694 | 2/2006 |
| JP | 2006053694 A | 2/2006 |
| JP | 2008059121 A | 3/2008 |
| JP | 2009053748 A | 3/2009 |
| JP | 2011188004 | 9/2011 |
| JP | 2011188004 A | 9/2011 |
| WO | 2006001361 A1 | 1/2006 |
| WO | 2009040538 | 4/2009 |
| WO | 2012057623 | 5/2012 |
| WO | 2012057623 A1 | 5/2012 |
| WO | 2012086120 A1 | 6/2012 |

OTHER PUBLICATIONS

Japanese Office Action for JP Application No. 2013-140131, dated Aug. 5, 2014, 6 pages.
Office Action for U.S. Appl. No. 13/831,124, dated Mar. 19, 2015, 14 pages.
PSonar URL: http://www.psonar.com/about retrieved on Aug. 24, 2016, 3 pages.
PCT International Search Report and Written Opinion for PCT/US2015/023680, dated Oct. 6, 2015, 13 pages.
PCT International Written Opinion for PCT/US2015/041624, dated Dec. 17, 2015, 7 Pages.
PCT International Search Report for PCT/US15/41624 dated Nov. 4, 2015, 5 pages.
PCT International Search Report for PCT/US15/23680 dated Aug. 3, 2015, 4 pages.
PCT International Preliminary Report on Patentability for PCT/US2015/023680, dated Oct. 4, 2016, 10 pages.
FFmpeg, "Demuxing," Doxygen, Dec. 5, 2014, 15 Pages, [online] [retrieved on Jul. 13, 2015] Retrieved from the Internet <URL:https://www.ffmpeg.org/doxygen/2.3/group_lavf_encoding.html>.
PCT International Search Report and Written Opinion for PCT/US15/12086 dated Mar. 17, 2016, 20 pages.
FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.
Iandola et al., "SqueezeNet: AlexNet-level accuracy with 50x fewer parameters and <0.5MB model size", arXiv:1602.07360v3 [cs.CV] Apr. 6, 2016 (9 pgs.).
Yang et al., "Unsupervised Extraction of Video Highlights Via Robust Recurrent Auto-encoders" arXiv:1510.01442v1 [cs.CV] Oct. 6, 2015 (9 pgs).
Tran et al., "Learning Spatiotemporal Features with 3D Convolutional Networks", arXiv:1412.0767 [cs.CV] Dec. 2, 2014 (9 pgs).
Schroff et al., "FaceNet: A Unified Embedding for Face Recognition and Clustering," IEEE Conference on Computer Vision and Pattern Recognition (CVPR), 2016, 10 pgs.
Parkhi et al., "Deep Face Recognition," Proceedings of the British Machine Vision, 2015, 12 pgs.
Iandola et al., "SqueezeNet: AlexNet-level accuracy with 50x fewer parameters and <0.5MB model size," arXiv:1602.07360, 2016, 9 pgs.
Ioffe et al., "Batch Normalization: Accelerating Deep Network Training by Reducing Internal Covariate Shift," arXiv:1502.03167, 2015, 11 pgs.
He et al., "Deep Residual Learning for Image Recognition," arXiv:1512.03385, 2015, 12 pgs.
Han et al., Deep Compression: Compressing Deep Neural Networks with Pruning, Trained Quantization and Huffman Coding, International Conference on Learning Representations 2016, 14 pgs.

* cited by examiner

$$S(t) = \frac{1}{W}\frac{\mathrm{d}x}{\mathrm{d}t} + \frac{1}{H}\frac{\mathrm{d}y}{\mathrm{d}t}$$

FIG. 5A $$S(t) = \frac{\mathrm{d}x}{\mathrm{d}t} + \frac{1}{A}\frac{\mathrm{d}y}{\mathrm{d}t} + \lambda\frac{\mathrm{d}\theta}{\mathrm{d}t}$$

$$\lambda = \sqrt{\frac{16}{A^2 + 1}}$$

FIG. 5B $$S(t) = \frac{\mathrm{d}x}{\mathrm{d}t} + \frac{1}{A}\frac{\mathrm{d}y}{\mathrm{d}t} + \lambda\frac{\mathrm{d}\theta}{\mathrm{d}t} + \mu\frac{\mathrm{d}s}{\mathrm{d}t}$$

$$\mu = \frac{1}{\sqrt{2(A^2 + 1)}}$$

FIG. 5C $$N(t) = S(t) \star H(t)$$

FIG. 5D

$$H_t(x) = \frac{1}{\sqrt{2\pi}\sigma} e^{\frac{-(x-t)^2}{2\sigma^2}}$$

FIG. 5E

$$\delta(t) = S(t) - \alpha N(t)$$

- if $c = 0$ and $\delta(t) > h_0 + h_+$ then $c = 1$;
- if $c = 1$ and $\delta(t) < h_0 - h_-$ then $c = 0$;
- if $c = 1$ and $\delta(t) > h_1 + h_+$ then $c = 2$;
- if $c = 2$ and $\delta(t) < h_1 - h_-$ then $c = 1$.

FIG. 7

SYSTEMS AND METHODS FOR EDITING VIDEOS BASED ON SHAKINESS MEASURES

FIELD

This disclosure relates to editing videos based on movements captured within the videos.

BACKGROUND

Shakiness of image sensor(s) that capture video content may result in shaky video content. A user may wish to edit the video content to remove shaky portions. Determining shakiness of portions of video content may be resource intensive (e.g., time, memory, processing power).

SUMMARY

This disclosure relates to editing videos based on movements captured within the videos. Video information defining video content may be accessed. The video content may include video frames. Motion vectors for the video frames may be determined. The motion vectors may represent motion of one or more visuals captured within individual video frames. A transformation matrix for the video frames may be determined based on the motion vectors. The transformation matrix may characterize rigid transformations between pairs of the video frames. Shakiness metrics for the video frames may be determined based on the transformation matrix. A shakiness threshold may be obtained. One or more of the video frames may be identified based on the shakiness metrics and the shakiness threshold. A video summary of the video content may be generated. The video summary may include the one or more identified video frames.

A system that edit videos based on movements captured within the videos may include one or more of physical storage media, processors, and/or other components. The physical storage media may store video information defining video content. Video content may refer to media content that may be consumed as one or more videos. Video content may include one or more videos stored in one or more formats/container, and/or other video content. The video content may have a progress length. In some implementations, the video content may include one or more of spherical video content, virtual reality content, and/or other video content. The video content may include video frames. The video frames may be characterized by a width, a height, and/or other characteristics.

The processor(s) may be configured by machine-readable instructions. Executing the machine-readable instructions may cause the processor(s) to facilitate editing videos based on movements captured within the videos. The machine-readable instructions may include one or more computer program components. The computer program components may include one or more of an access component, a motion vector component, a transformation matrix component, a shakiness metric component, a shakiness threshold component, an identification component, a video summary component, and/or other computer program components.

The access component may be configured to access the video information defining one or more video content and/or other information. The access component may access video information from one or more storage locations. The access component may be configured to access video information defining one or more video content during acquisition of the video information and/or after acquisition of the video information by one or more image sensors.

The motion vector component may be configured to determine motion vectors for the video frames. The motion vectors may represent motion of one or more visuals captured within individual video frames, and/or other information. In some implementations, the motion vectors for the video frames may be determined based on movement of a pixel group and/or other information. In some implementations, the pixel group may include an eight-by-eight pixel block.

The transformation matrix component may be configured to determine a transformation matrix for the video frames based on the motion vectors and/or other information. The transformation matrix may characterize rigid transformations between pairs of the video frames and/or other information. In some implementations, the rigid transformations may be estimated using a RANSAC (RANdom SAmple Consensus) algorithm and/or other information.

The shakiness metric component may be configured to determine shakiness metrics for the video frames. The shakiness metric for the video frames may be determined based on the transformation matrix and/or other information. In some implementations, the shakiness metrics for the video frames may be determined based on a rate of change in a lateral translation, a rate of change in a vertical translation, a rate of change in an angular translation, and/or a rate of change in a linear first-order approximation of a scaling factor of the transformation matrix. In some implementations, the rate of change in the lateral translation may be normalized based on a width of the video content, the rate of change in the vertical translation may be normalized based on a height of the video content, the rate of change in the angular translation may be matched to the lateral translation and the vertical translation via a first matching factor, and/or the rate of change in the linear first-order approximation of the scaling factor may be matched to the lateral translation and the vertical translation via a second matching factor.

The shakiness threshold component may be configured to obtain a shakiness threshold and/or other information. In some implementations, the shakiness threshold may be obtained based on user input.

The identification component may be configured to identify one or more of the video frames based on the shakiness metrics, the shakiness threshold, and/or other information. In some implementations, one or more of the video frames may be identified based on comparison of the shakiness metrics of the video frames and the shakiness threshold and/or other information. In some implementations, identification may also be content-dependent based on hysteresis algorithms with multi-knee parameters or finite-state machines.

The video summary component may be configured to generate a video summary of the video content. The video summary may include the one or more identified video frames and/or other information. In some implementations, the video summary component may be configured to apply one or more filters to remove noise from the video frames. In some implementations, the video content may have been captured at thirty frames per second, and one or more filters may be applied using a time scale of fives frames. In some implementations, the video content may have been captured at sixty frames per second, and one or more filters may be applied using a time scale of ten frames.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
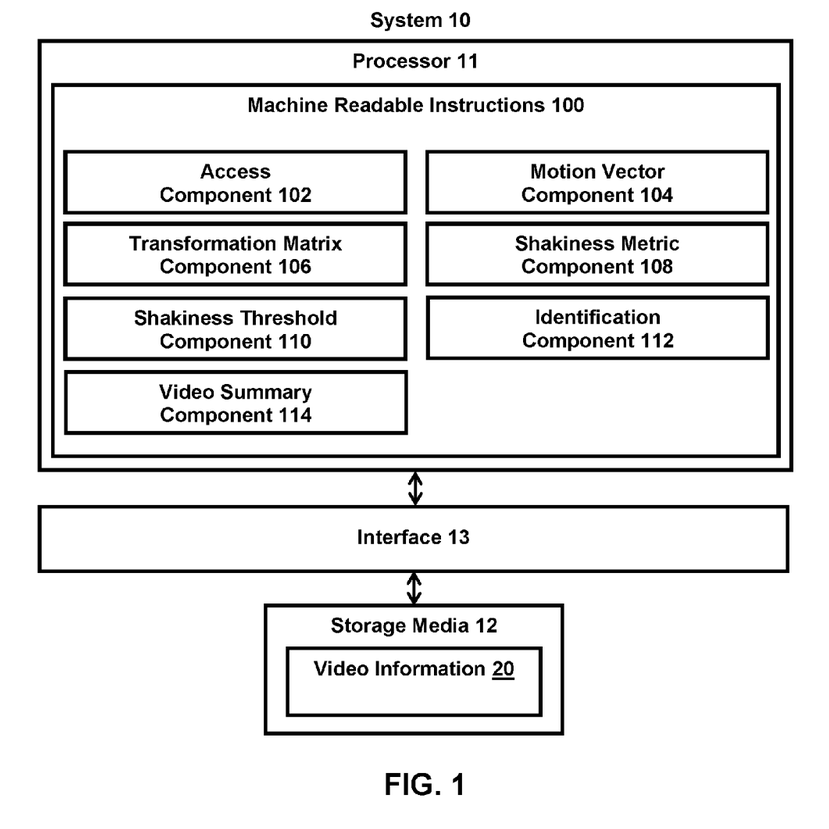
FIG. 1 illustrates a system that edits videos based on movements captured within the videos.

FIG. 1 illustrates system 10 for editing videos based on movements captured within the videos. System 10 may include one or more of processor 11, storage media 12, interface 13 (e.g., bus, wireless interface), and/or other components. Video information 20 defining video content may be accessed by processor 11. The video content may include video frames. Motion vectors for the video frames may be determined. The motion vectors may represent motion of one or more visuals captured within individual video frames. A transformation matrix for the video frames may be determined based on the motion vectors. The transformation matrix may characterize rigid transformations between pairs of the video frames. Shakiness metrics for the video frames may be determined based on the transformation matrix. A shakiness threshold may be obtained. One or more of the video frames may be identified based on the shakiness metrics and the shakiness threshold. A video summary of the video content may be generated. The video summary may include the one or more identified video frames.

Storage media 12 may be configured to include electronic storage medium that electronically stores information. Storage media 12 may store software algorithms, information determined by processor 11, information received remotely, and/or other information that enables system 10 to function properly. For example, storage media 12 may store information relating to video information, video content, video frames, motion vectors, transformation matrix, shakiness metric, shakiness threshold, video summary, and/or other information.

Storage media 12 may store video information 20 defining one or more video content. Video content may refer to media content that may be consumed as one or more videos. Video content may include one or more videos stored in one or more formats/container, and/or other video content. A video may include a video clip captured by a video capture device, multiple video clips captured by a video capture device, and/or multiple video clips captured by separate video capture devices. A video may include multiple video clips captured at the same time and/or multiple video clips captured at different times. A video may include a video clip processed by a video application, multiple video clips processed by a video application and/or multiple video clips processed by separate video applications.

Figure 3:
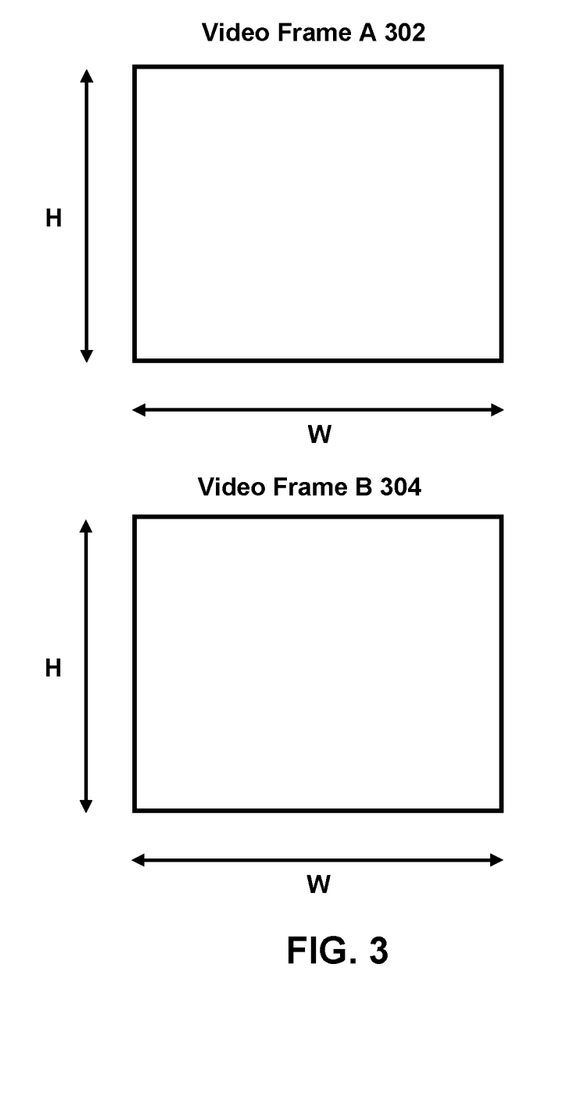
FIG. 3 illustrates example video frames.

Video content may include video frames. The video frames may be characterized by a width, a height, and/or other characteristics. For example, FIG. 3 illustrates a video frame A 302 and a video frame B 304 of a single video content. The video frame A 302 and the video frame B 304 may be adjacent video frames. The video frame A 302 and the video frame B 304 may have a height of H and a width of W. The frame A 302 and the video frame B 304 may be characterized by other characteristics.

Video content may have a progress length. A progress length may be defined in terms of time durations and/or frame numbers. For example, video content may include a video having a time duration of 60 seconds. Video content may include a video having 1800 video frames. Video content having 1800 video frames may have a play time duration of 60 seconds when viewed at 30 frames/second. Other time durations and frame numbers are contemplated.

In some implementations, video content may include one or more of spherical video content, virtual reality content, and/or other video content. Spherical video content may refer to a video capture of multiple views from a single location. Spherical video content may include a full spherical video capture (360 degrees of capture) or a partial spherical video capture (less than 360 degrees of capture). Spherical video content may be captured through the use of one or more cameras/image sensors to capture images/videos from a location. The captured images/videos may be stitched together to form the spherical video content.

Virtual reality content may refer to content that may be consumed via virtual reality experience. Virtual reality content may associate different directions within the virtual reality content with different viewing directions, and a user may view a particular directions within the virtual reality content by looking in a particular direction. For example, a user may use a virtual reality headset to change the user's direction of view. The user's direction of view may correspond to a particular direction of view within the virtual reality content. For example, a forward looking direction of view for a user may correspond to a forward direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video capture from a path taken by the capturing device(s) in the moving position. For example, spherical video content and/or virtual reality content may include video capture from a person walking around in a music festival.

Referring to FIG. 1, processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 100 to facilitate editing videos based on movements captured within the videos. Machine readable instructions 100 may include one or more computer program components. Machine readable instructions 100 may include one or more of access component 102, motion vector component 104, transformation matrix component 106, shakiness metric component 108, shakiness threshold component 110, identification component 112, video summary component 114, and/or other computer program components.

Access component 102 may be configured to access video information defining one or more video content and/or other information. Access component 102 may access video information from one or more storage locations. A storage location may include storage media 12, electronic storage of one or more image sensors (not shown in FIG. 1), and/or other locations. For example, access component 102 may access video information 20 stored in storage media 12. Access component 102 may be configured to access video information defining one or more video content during acquisition of the video information and/or after acquisition of the video information by one or more image sensors. For example, access component 102 may access video information defining a video while the video is being captured by one or more image sensors. Access component 102 may access video information defining a video after the video has been captured and stored in memory (e.g., storage media 12).

Motion vector component 104 may be configured to determine motion vectors for the video frames. Motion vectors may represent motion of one or more visuals captured within individual video frames and/or other information. Motion may exist within video frames due to motion of image sensor(s) that captured the video frames and/or due to motion of a thing captured within the video frames. Motion vectors may be determined using one or more of block-matching algorithm, phase correlation and frequency domain methods, pixel recursive algorithms, optical flow, feature detection, and/or other criteria matching methods.

Figure 4:
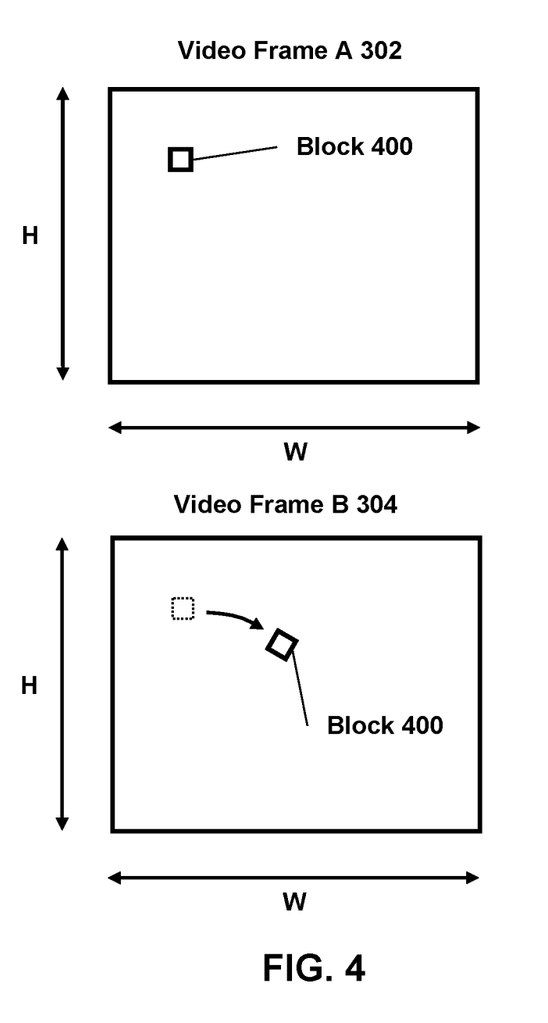
FIG. 4 illustrates example movement within video frames.

The motion vectors for the video frames may be determined based on movement of a pixel group and/or other information. Determining motion vectors based on movement of a pixel group rather than on movement of individual pixels may increase the speed with which motion vectors may be determined. Determining motion vectors based on movement of a pixel group rather than on movement of individual pixels may require less resources (e.g., memory, speed). In some implementations, the pixel group may include an eight-by-eight pixel block. For example, FIG. 4 illustrates an example pixel group referred to as block 400. Motion vector for pixel groups may indicate how much each pixel groups are moving between video frames. Motion vector component 104 may determine motion vector for movement of block 400 from its position in video frame A 302 to its position in video frame B 304.

Transformation matrix component 106 may be configured to determine a transformation matrix for the video frames based on the motion vectors and/or other information. Motion vectors may characterize a rotation angle and two translations between pairs of video frames. A transformation matrix may characterize rigid transformations between pairs of video frames and/or other information. For example, a transformation matrix may characterize rigid transformation between video frame A 302 and video frame B 304. In some implementations, rigid transformations may be estimated using a RANSAC (RANdom SAmple Consensus) algorithm and/or other information. Parameters for a transformation matrix may include x(t), y(t), θ(t), and/or other parameters. The term θ(t) may characterize rotations as a function of time (angular translation), and the terms x(t) and y(t) may characterize translations in the x-direction (lateral translation) and y-direction (vertical translation), respectively, as a function of time. Other directions are contemplated.

Shakiness metric component 108 may be configured to determine shakiness metrics for the video frames. The shakiness metric for the video frames may be determined based on the transformation matrix and/or other information. FIGS. 5A-5F illustrates example equations for shakiness metric determination. The shakiness metrics for the video frames may be determined based on a rate of change in lateral translation, a rate of change in vertical translation, a rate of change in an angular translation, and/or a rate of change in a linear first-order approximation of a scaling factor of the transformation matrix.

Figure 5A:
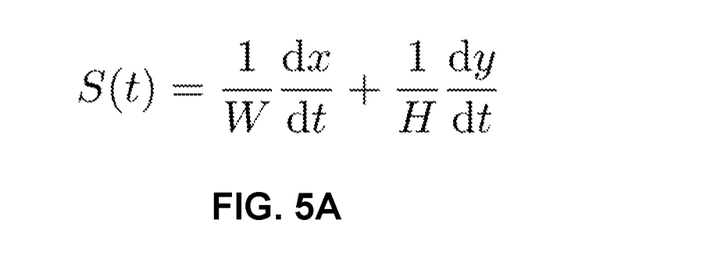
FIGS. 5A-5F illustrate example equations for shakiness metric determination.
Figure 5B:
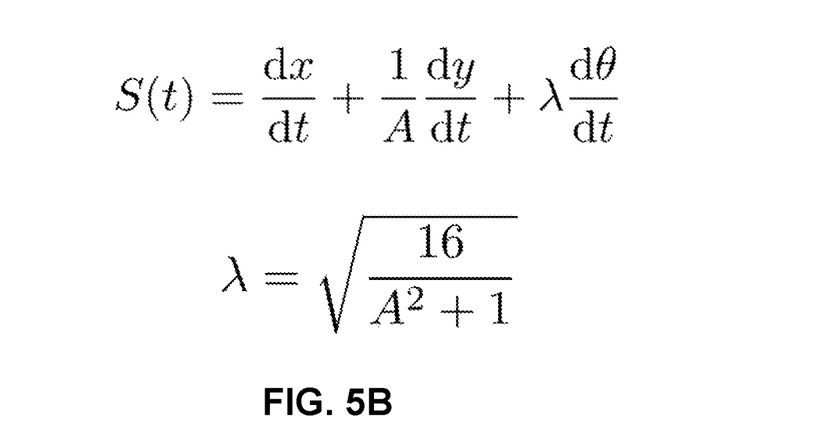
Figure 5C:
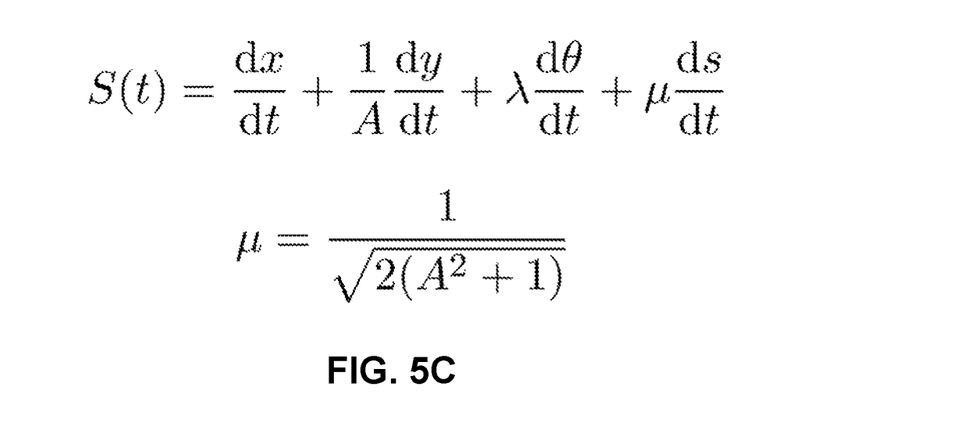

For example, FIG. 5A illustrates an example equation for determining shakiness metrics based on a rate of change in lateral translation and a rate of change in vertical translation of the transformation matrix. FIG. 5B illustrates example equations for determining shakiness metrics based on a rate of change in lateral translation, a rate of change in vertical translation, and a rate of change in an angular translation of the transformation matrix. FIG. 5C illustrates example equations for determining shakiness metrics based on a rate of change in lateral translation, a rate of change in vertical translation, a rate of change in an angular translation, and/or a rate of change in a linear first-order approximation of a scaling factor of the transformation matrix.

One or more terms of shakiness metric determination may be normalized. For example, the lateral translation may be normalized based on a width of the video content (1/W). The vertical translation may be normalized based on a height of the video content (1/H) or an aspect ratio A (X/Y), The angular translation may be matched to the lateral translation and the vertical translation via a first matching factor ($\lambda$). The first matching factor ($\lambda$) may represent an angle spatial-normalization coefficient. The rate of change in the linear first-order approximation of the scaling factor may be matched to the lateral translation and the vertical translation via a second matching factor ($\mu$). The second matching factor ($\mu$) may represent a scaling normalization coefficient.

Figure 6:
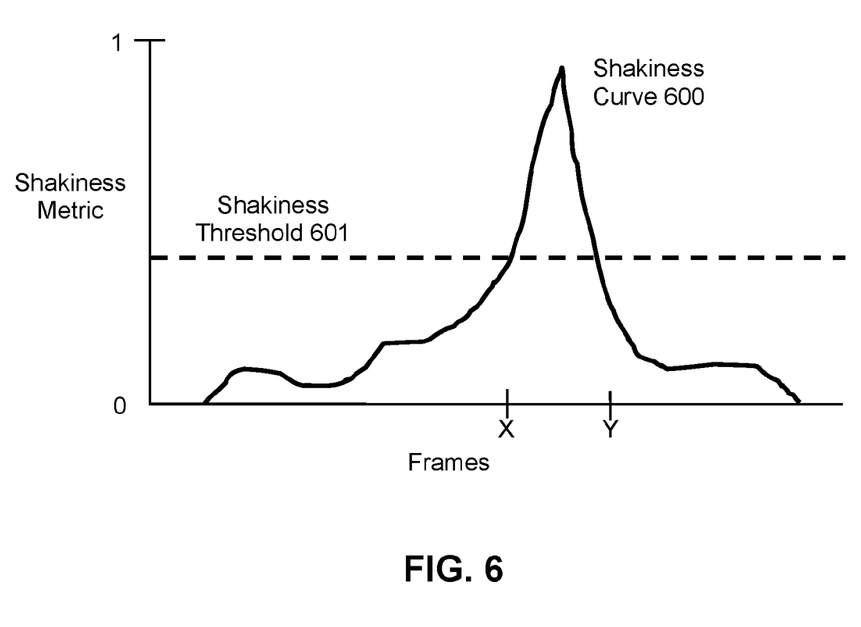
FIG. 6 illustrates example shakiness curve and shakiness threshold.

Shakiness metrics may be normalized (e.g., between 0 and 1), where 0 indicates a stable movement of image sensor(s) that captured the video content and 1 indicates a shaky movement of the image sensor(s). Shakiness metrics of the video frames of video content as a function of progress through the video content may form a shakiness curve for the video content. For example, FIG. 6 illustrates an example shakiness curve 600. The shakiness curve may include values between 0 and 1. Other values are contemplated.

Figure 5D:
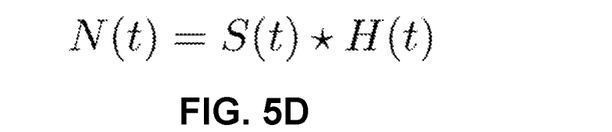
Figure 5E:
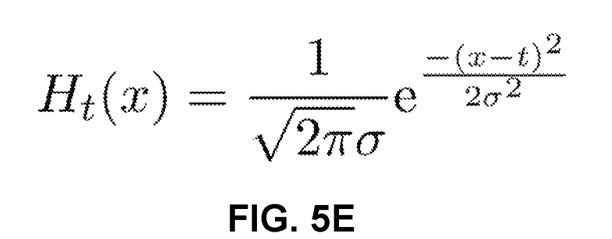
Figure 5F:
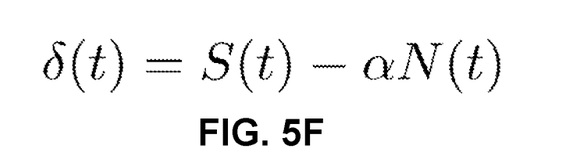
Figure 7:
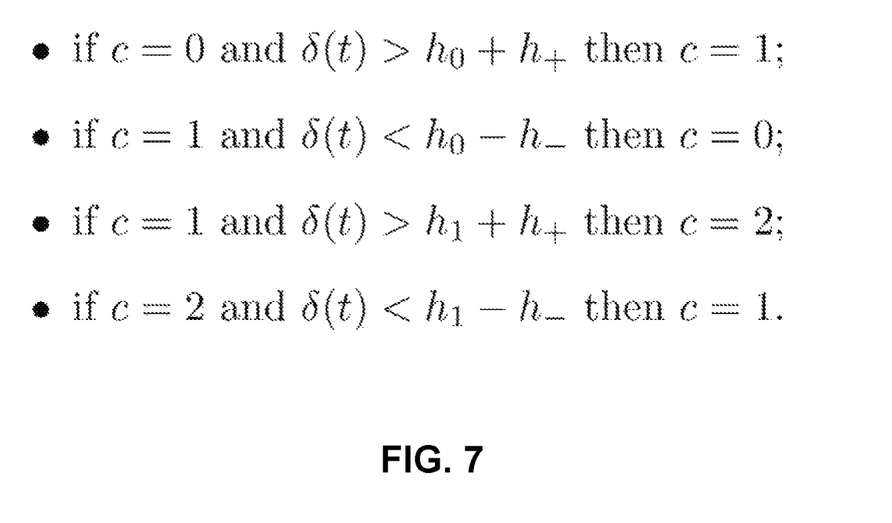
FIG. 7 illustrates example shakiness metric classification rules.

In some implementations, shakiness metrics may be classified into multiple levels of shakiness (e.g., not shaky, acceptable, bad). Shakiness metrics may be classified using a dynamic thresholding with hysteresis method and/or other information. A medium sliding noise value may be acquired by applying a low-pass filter on the shakiness signal, such as shown in FIG. 5D. The term H may represent a Gaussian filter with a scalable window support. An example formulation of the term H is shown in FIG. 5E. A hysteresis rule may be include a dynamic threshold, such as shown in FIG. 5F, where the term alpha (a) may represent a static parameter and the shakiness metrics may be classified into categories (e.g., c∈{0: not shaky, 1: acceptable, 2: bad}), following the example rule shown in FIG. 7. The parameters ho and hi may represent categories thresholds (which may be expanded to support more than three categories shown in the example) and may represent positive and negative hysteresis knees.

The determination of motion vectors and shakiness metrics as described herein may enable fast and efficient determination of shakiness metrics for individual video frames of the video content. The determination of motion vectors and shakiness metrics as described herein may enable resource limited devices (e.g., mobile devices) to determine the shakiness metrics of the video frames without offloading the determination task to another computing device with more resources (e.g., server).

Shakiness threshold component 110 may be configured to obtain a shakiness threshold and/or other information. A shakiness threshold may refer to a level(s) of shakiness metric at which the video edits should be made. A shakiness threshold may indicate the level(s) of shakiness metric at which the video frames should be trimmed. Shakiness threshold component may obtain a shakiness threshold based on one or more of a system default, user input, desired length of the video edit, accompanying soundtrack, video content (e.g., type of event/scene within the video content), and/or other information. In some implementations, the shakiness threshold may form a shakiness threshold line. A shakiness threshold line may include one or more of straight (horizontal, vertical, sloped) portions and/or curved portions. FIG. 6 illustrates an example shakiness threshold 601. In some implementations, a shakiness threshold may be defined by levels of shakiness. For example, shakiness metrics may be classified into multiple levels of shakiness (e.g., not shaky, acceptable, bad) and the shakiness threshold may define at which of the categories the video edits should be made/video frames should be trimmed (e.g., trim video portions determined to be shaky).

Identification component 112 may be configured to identify one or more of the video frames based on the shakiness metrics, the shakiness threshold, and/or other information. One or more of the video frames may be identified based on comparison of the shakiness metrics of the video frames and the shakiness threshold and/or other information. Identified video frames may include those video frames with shakiness metric lower than, higher than, and/or equal to the shakiness threshold. For example, referring to FIG. 6, video frames between frames X and Y may include shakiness metrics greater than shakiness threshold 601. Identified video frames may include video frames between frames X and Y (including or excluding frames X and Y), video frames outside the range of frames X and Y (including or excluding frames X and Y) or other video frames. In some implementations, identification may be content-dependent based on hysteresis algorithms with multi-knee parameters or finite-state machines. For example, for shakiness metrics classified into multiple levels of shakiness, identification component 112 may identify video frames that are classified in one or more categories (e.g., not shaky, acceptable).

Video summary component 114 may be configured to generate a video summary of the video content. A video summary may include a combination/concatenation of vide frames identified by identification component 112. The video summary may include one or more of the identified video frames and/or other information. For example, referring to FIG. 6, the video summary may include video frames between frames X and Y (including or excluding frames X and Y), video frames outside the range of frames X and Y (including or excluding frames X and Y) or other video frames. Video summary component 114 may trim video frames with shakiness metrics that are lower than, higher than, and/or equal to the shakiness threshold. In some implementations, a user may be presented with an option to confirm/change one or more video frames (and/or groups of video frames) for inclusion in the video summary.

In some implementations, video summary component 114 may be configured to apply one or more filters to remove noise from one or more video frames. In some implementations, the filters may be applied with a time scale ratio of 1 to 6. For example, the video content may have been captured at thirty frames per second, and one or more filters may be applied using a time scale of fives frames. The video content may have been captured at sixty frames per second, and one or more filters may be applied using a time scale of ten frames. Other time scale ratios are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 11 and storage media 12 are shown to be connected to interface 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with storage media 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIG. 1 as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 102, 104, 106, 108, 110, 112, and/or 114 may be eliminated, and some or all of its functionality may be provided by other computer program components. As another example, processor 11 may be configured to execute one or more additional computer program components that may perform some or all of the functionality attributed to one or more of computer program components 102, 104, 106, 108, 110, 112, and/or 114 described herein.

The electronic storage media of storage media 12 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Storage media 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Storage media 12 may be a separate component within system 10, or storage media 12 may be provided integrally with one or more other components of system 10 (e.g., processor 11). Although storage media 12 is shown in FIG. 1 as a single entity, this is for illustrative purposes only. In some implementations, storage media 12 may comprise a plurality of storage units. These storage units may be physically located within the same device, or storage media 12 may represent storage functionality of a plurality of devices operating in coordination.

Figure 2:
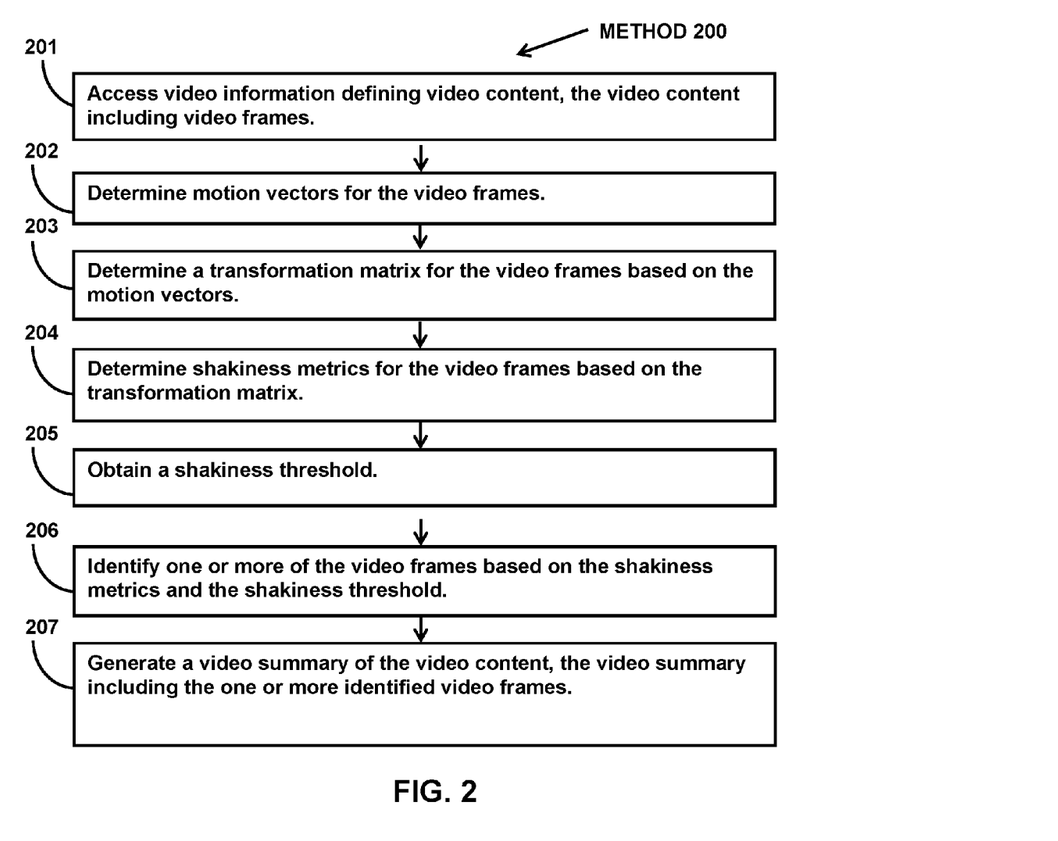
FIG. 2 illustrates a method for edits videos based on movements captured within the videos.

FIG. 2 illustrates method 200 for editing videos based on movements captured within the videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, video information defining video content may be accessed. The video information may be stored in physical storage media. In some implementation, operation 201 may be performed by a processor component the same as or similar to access component 102 (Shown in FIG. 1 and described herein).

At operation 202, motion vectors for the video frames may be determined. The motion vectors may represent motion of one or more visuals captured within individual video frames. In some implementations, operation 202 may be performed by a processor component the same as or similar to motion vector component 104 (Shown in FIG. 1 and described herein).

At operation 203, a transformation matrix may be determined for the video frames. The transformation matrix may be determined based on the motion vectors. The transformation matrix may characterize rigid transformations between pairs of video frames. In some implementations, operation 203 may be performed by a processor component the same as or similar to transformation matrix component 106 (Shown in FIG. 1 and described herein).

At operation 204, shakiness metrics for the video frames may be determined. The shakiness metrics may be determined based on the transformation metric. In some implementations, operation 204 may be performed by a processor component the same as or similar to shakiness metric component 108 (Shown in FIG. 1 and described herein).

At operation 205, device shakiness threshold may be obtained. In some implementations, operation 205 may be performed by a processor component the same as or similar to shakiness threshold component 110 (Shown in FIG. 1 and described herein).

At operation 206, one or more of the video frames may be identified based on the shakiness metrics and the shakiness threshold. In some implementations, operation 206 may be performed by a processor component the same as or similar to identification component 110 (Shown in FIG. 1 and described herein).

At operation 207, a video summary of the video content may be generated. The video summary may include one or more identified video frames. In some implementations, operation 207 may be performed by a processor component the same as or similar to video summary component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for editing videos based on movement captured within the videos, the system comprising:
   physical storage media storing video information defining video content, the video content including video frames;
   one or more physical processors configured by machine readable instructions to:
   access the video information defining the video content;
   determine motion vectors for the video frames, the motion vectors representing motion of one or more visuals captured within individual video frames;
   determine a transformation matrix for the video frames based on the motion vectors, the transformation matrix characterizing rigid transformations between pairs of the video frames;
   determine shakiness metrics for the video frames based on the transformation matrix;

obtain a shakiness threshold; and
identify one or more of the video frames based on the shakiness metrics and the shakiness threshold;
generate a video summary of the video content, the video summary including the one or more identified video frames.

2. The system of claim 1, wherein the shakiness metrics for the video frames are determined based on a rate of change in a lateral translation, a rate of change in a vertical translation, a rate of change in an angular translation, and a rate of change in a linear first-order approximation of a scaling factor of the transformation matrix.

3. The system of claim 2, wherein the rate of change in the lateral translation is normalized based on a width of the video content, the rate of change in the vertical translation is normalized based on a height of the video content, the rate of change in the angular translation is matched to the lateral translation and the vertical translation via a first matching factor, and the rate of change in the linear first-order approximation of the scaling factor is matched to the lateral translation and the vertical translation via a second matching factor.

4. The system of claim 1, wherein the rigid transformations are estimated using a RANSAC algorithm.

5. The system of claim 1, wherein the motion vectors for the video frames are determined based on movement of a pixel group.

6. The system of claim 5, wherein the pixel group includes an eight-by-eight pixel block.

7. The system of claim 1, wherein the one or more physical processors are further configured by machine readable instruction to apply one or more filters to remove noise from the video frames.

8. The system of claim 7, wherein the video content is captured at thirty frames per second, and the one or more filters are applied using a time scale of fives frames.

9. The system of claim 7, wherein the video content is captured at sixty frames per second, and the one or more filters are applied using a time scale of ten frames.

10. A method for editing videos based on movement captured within the videos, the method implemented in a system including one or more physical processors, the method comprising:
accessing, by the one or more physical processors, video information defining video content, the video content including video frames;
determining, by the one or more physical processors, motion vectors for the video frames, the motion vectors representing motion of one or more visuals captured within individual video frames;
determining, by the one or more physical processors, a transformation matrix for the video frames based on the motion vectors, the transformation matrix characterizing rigid transformations between pairs of the video frames;
determining, by the one or more physical processors, shakiness metrics for the video frames based on the transformation matrix;
obtaining, by the one or more physical processors, a shakiness threshold; and
identifying, by the one or more physical processors, one or more of the video frames based on the shakiness metrics and the shakiness threshold;
generating, by the one or more physical processors, a video summary of the video content, the video summary including the one or more identified video frames.

11. The method of claim 10, wherein the shakiness metrics for the video frames are determined based on a rate of change in a lateral translation, a rate of change in a vertical translation, a rate of change in an angular translation, and a rate of change in a linear first-order approximation of a scaling factor of the transformation matrix.

12. The method of claim 11, wherein the rate of change in the lateral translation is normalized based on a width of the video content, the rate of change in the vertical translation is normalized based on a height of the video content, the rate of change in the angular translation is matched to the lateral translation and the vertical translation via a first matching factor, and the rate of change in the linear first-order approximation of the scaling factor is matched to the lateral translation and the vertical translation via a second matching factor.

13. The method of claim 10, wherein the rigid transformations are estimated using a RANSAC algorithm.

14. The method of claim 10, wherein the motion vectors for the video frames are determined based on movement of a pixel group.

15. The method of claim 14, wherein the pixel group includes an eight-by-eight pixel block.

16. The method of claim 10, further comprising applying, by the one or more physical processors, one or more filters to remove noise from the video frames.

17. The method of claim 16, wherein the video content is captured at thirty frames per second, and the one or more filters are applied using a time scale of fives frames.

18. The method of claim 16, wherein the video content is captured at sixty frames per second, and the one or more filters are applied using a time scale of ten frames.

19. A system for editing videos based on movement captured within the videos, the system comprising:
physical storage media storing video information defining video content, the video content including video frames;
one or more physical processors configured by machine readable instructions to:
access the video information defining the video content;
determine motion vectors for the video frames, the motion vectors representing motion of one or more visuals captured within individual video frames, wherein the motion vectors for the video frames are determined based on movement of an eight-by-eight pixel block;
determine a transformation matrix for the video frames based on the motion vectors, the transformation matrix characterizing rigid transformations between pairs of the video frames;
determine shakiness metrics for the video frames based on the transformation matrix, wherein the shakiness metrics for the video frames are determined based on a rate of change in a lateral translation, a rate of change in a vertical translation, a rate of change in an angular translation, and a rate of change in a linear first-order approximation of a scaling factor of the transformation matrix;
obtain a shakiness threshold; and
identify one or more of the video frames based on the shakiness metrics and the shakiness threshold;
generate a video summary of the video content, the video summary including the one or more identified video frames.

20. The system of claim 19, wherein the rate of change in the lateral translation is normalized based on a width of the video content, the rate of change in the vertical translation is normalized based on a height of the video content, the rate of change in the angular translation is matched to the lateral translation and the vertical translation via a first matching factor, and the rate of change in the linear first-order approximation of the scaling factor is matched to the lateral translation and the vertical translation via a second matching factor.

* * * * *